United States Patent [19]

Jervis

[11] 4,386,984
[45] * Jun. 7, 1983

[54] HEAT-SHRINKABLE HOLLOW ARTICLE

[75] Inventor: James E. Jervis, Atherton, Calif.

[73] Assignee: Raychem Corporation, Menlo Park, Calif.

[*] Notice: The portion of the term of this patent subsequent to Oct. 27, 1998, has been disclaimed.

[21] Appl. No.: 281,987

[22] Filed: Jul. 10, 1981

Related U.S. Application Data

[63] Continuation of Ser. No. 875,110, Feb. 3, 1978, Pat. No. 4,297,155.

[51] Int. Cl.³ .................. B29C 27/00; H02G 15/02; F10L 57/00; B65D 59/06
[52] U.S. Cl. .................. 156/86; 174/74 A; 174/DIG. 8; 138/96 R; 428/35
[58] Field of Search ......... 156/86; 174/74 A, DIG. 8; 428/35; 264/230; 285/381; 138/96 R

[56] References Cited

U.S. PATENT DOCUMENTS

| | | | |
|---|---|---|---|
| 3,334,925 | 8/1967 | Jayne | 174/84 R |
| 3,448,182 | 6/1969 | Derbyshire et al. | |
| 3,513,429 | 5/1970 | Helsop | 174/84 R |
| 3,526,683 | 9/1970 | Heslop et al. | |
| 3,678,174 | 7/1972 | Ganzhorn | |
| 3,847,183 | 11/1974 | Meyer | |
| 4,297,155 | 10/1981 | Jervis | 428/35 |

FOREIGN PATENT DOCUMENTS

| | | |
|---|---|---|
| 2321754 | 8/1976 | France |
| 1437177 | 8/1975 | United Kingdom |

Primary Examiner—William R. Dixon, Jr.
Attorney, Agent, or Firm—Lyon & Lyon

[57] ABSTRACT

A heat-shrinkable hollow article having one open end affording access to an internal cavity, the wall defining the internal cavity being shaped to provide stop means projecting into the cavity at a position or positions between the open end and the end of the cavity remote from the open end, whereby after heat-shrinking of the article onto a substrate a gap is left between the substrate and the end of the cavity remote from said open end.

2 Claims, 6 Drawing Figures

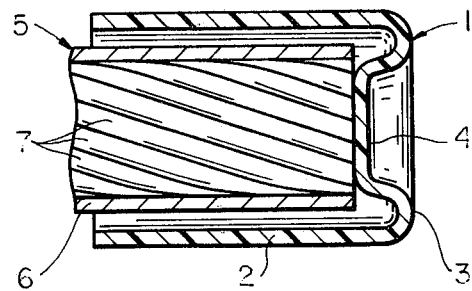
FIG_1
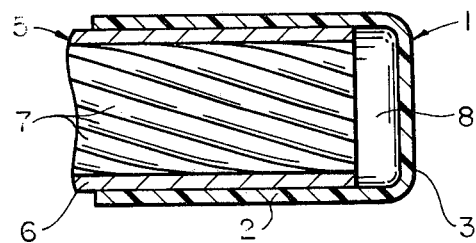
FIG_2
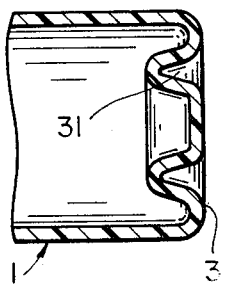
FIG_3
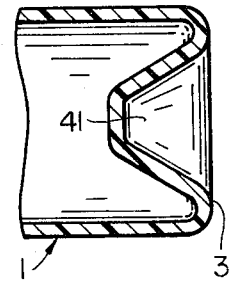
FIG_4

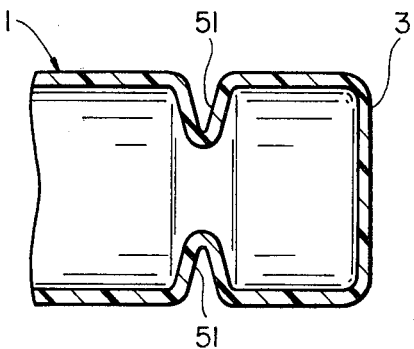
FIG_5
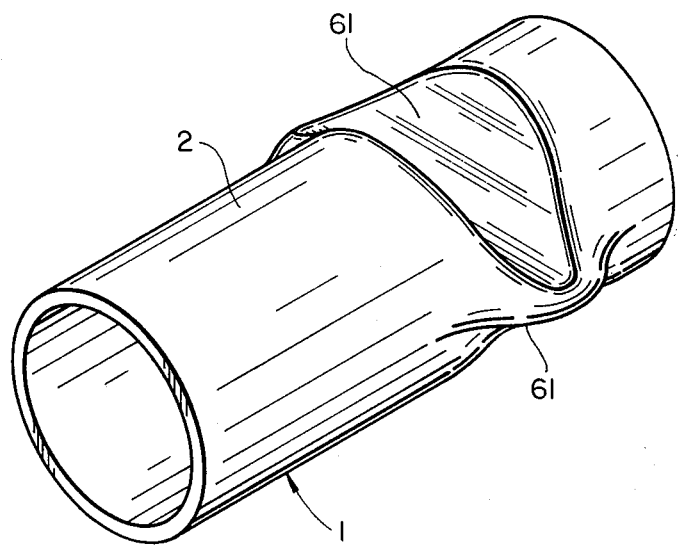
FIG_6

HEAT-SHRINKABLE HOLLOW ARTICLE

This application is a divisional of application Ser. No. 875,110 filed Feb. 3, 1978, now U.S. Pat. No. 4,297,155, the disclosure of which is incorporated herein by reference.

BACKGROUND OF THE INVENTION

1. Field of the Invention

This invention relates to heat-recoverable articles, more especially to such articles for use in protecting the ends of a length of cable, and to processes for their use.

2. Summary of the Prior Art

When electric cables, for example power or telecommunications cables, having a number of conductors surrounded by a jacket of insulating material are manufactured, they are frequently cut into lengths suitable for transport and storage on a former, for example a spool. The cut ends are protected against attack by water or other damaging media, and against mechanical injury by a covering which may be a wrapping of a tape or by a heat-shrinkable "end-cap".

The end cap is a generally tubular article, having one closed and one open end, which is capable of shrinking radially when heated above a certain temperature or temperature range. The article is made, for example, by moulding a thermoplastic composition containing a chemical crosslinking agent, in an appropriate shape having a diameter slightly smaller than the smallest diameter of cable in the range of sizes for which it is to be used. The crosslinked moulded article is then heated, expanded by air or mechanical pressure, cooled while maintaining the pressure, and then the pressure is released. In use, the article is placed over the end of the cable to be protected, and heated to cause it to shrink. The inner surface of the article may, if desired, be provided with a coating that assists in bonding the cap to substrate cable, and in preventing moisture ingress, for example a hot melt adhesive, or a non-crystalline layer of, for example, mastic.

Although the use of a heat-shrinkable "end-cap" has become accepted, there remains a problem, which is also present when other means of protecting cable ends, for example with tape-wrapping, are used, namely that during transport and storage of the capped cable, relative movement of the conductors and the insulating jacket (to which the end covering is firmly attached) tends to force the conductors through the closed end of the protective covering, allowing moisture ingress, etc.

SUMMARY OF THE INVENTION

The present invention provides a heat-shrinkable hollow article having one open end, the wall defining its internal cavity being shaped to provide stop means projecting into the internal cavity at a position or positions between the open end and the end of the cavity remote from the open end. The stop means, otherwise known as locating or positioning means, is or are so positioned and of such dimensions that when a substrate, for example, the end of a cable, is inserted into the open end it does not occupy the whole length of the cavity but instead abuts the stop means. After heating the hollow article to cause it to shrink about the substrate, a space will remain between the end of the article and the end of the cavity remote from the open end, which remote end will normally be a closed end wall of the cavity.

Advantageously, the stop means is or are dimensionally heat-unstable with a dimensionally stable form which does not project into the internal cavity of the article. Alternatively, at least part of the stop means may be dimensionally stable but will apparently change in shape on recovery as the remainder of the article shrinks around it. It will be appreciated that the form and location of the stop means may vary, depending inter alia on the expected extent of growth of the conductor relative to the insulation and the wall thickness of the jacket as a proportion of the diameter of the cable.

The stop means is or are advantageously formed in the inner wall of the article during the stage of manufacture that includes expansion. For example, while the article is being heated and subjected to forces to expand it, the wall may be deformed inward at the location(s) where stop means is or are required, and the deformation retained until the article has been cooled. The stop means may take the form of finger-like projections in the circumferential wall, an annular ridge in the end or circumferential wall (formed, for example, by making a corresponding groove in the outer surface), one or more embossments or dimples in the inner surface of the closed end wall, steps or ridges, recoverable or otherwise as required, in the internal diameter of the article, etc. In cases where the stop means are dimensionally unstable, at least in part, they will retract on heating, thus allowing the growth in conductors to take place with reduced possibilities of damage to the protecting end cap.

The present invention also provides a process for covering a substrate, for example the end of a cable, which comprises so positioning the article of the invention and the substrate that the stop means and a portion of the substrate are in abutment, and heating the article to cause recovery about the substrate. Advantageously, the open end region of the article is heated to cause it to recover first, so that the end grips the substrate to prevent or inhibit relative movement of article and substrate when the stop means, if it is recoverable, changes dimension, as the remainder of the article is heated.

The invention also provides a substrate covered by the article or the process of the invention, especially a cable covered by an end-cap.

The heat-recoverable article may be made for example of any of the materials known to be capable of being rendered heat-recoverable, for example those described in U.S. Pat. Nos. 2,027,692, 3,086,242 or 3,597,372 the disclosures of which are incorporated by reference herein. The materials may be crosslinked, by radiation or by chemical means, and may contain any of the usual additives, for example, fillers, pigments, flame-retardants, fungicides and antioxidants. The inner surface may be coated with suitable lining material, and the outer surface may have means, for example thermochromic paint, to indicate when the article has reached a desired temperature.

BRIEF DESCRIPTION OF THE DRAWINGS

Several forms of article constructed in accordance with the invention will now be described in greater detail, by way of example only, with reference to the accompanying drawings, in which:

FIG. 1 shows a cross-section of a first form of article constructed in accordance with the invention, in position for recovery over a cable end;

FIG. 2 is a cross-section of the article of FIG. 1 after recovery;

FIGS. 3, 4 and 5 illlustrate other shapes of articles constructed in accordance with the invention; and FIG. 6 is a perspective view of another article of the invention.

DETAILED DESCRIPTION OF THE PREFERRED EMBODIMENTS OF THE INVENTION

Referring now more especially to FIGS. 1 and 2, a heat-shrinkable end-cap, indicated generally by the reference numeral 1, comprises a circumferential wall 2 and an end wall 3, the latter having in its dimensionally heat-unstable form a boss or dimple 4 extending axially inwards to form a stop or positioning or locating means for the end of a cable, indicated generally by reference numeral 5, comprising a jacket 6 and a plurality of individually insulated conductors 7, wound helically.

As illustrated by FIGS. 1 and 2, the end cap 1 is originally positioned over the cable 5 so that the dimple 4 is in abutment with the ends of the central conductors 7. The end cap is then heated to cause it to shrink, the open end preferably being shrunk first, and the dimple 4 recovers so that the end wall 3 becomes generally planar, leaving a gap 8 into which the conductors 7 may safely "grow" during handling.

FIGS. 3, 4 and 5 illustrate other forms of the cap 1. In FIG. 3, an annular groove and ridge 31 are provided in the end wall 3. In FIG. 4, a dimple 41 is provided, deeper than in FIG. 1, to allow for greater growth, while in FIG. 5, a plurality of conical projections 51 into the interior provides a stop that locates the end of a cable in the cap.

FIG. 6 illustrates a tubular article 1 having a circumferential heat-recoverable wall 2 which defines an internal cavity, two open ends and a stop means 61. When heated, this article recovers to a heat-stable, substantially cylindrical shape.

It will be appreciated that the provision of locating or stop means in heat-recoverable articles has applications other than those described herein for use with end caps for electrical cables, and the scope of the invention claimed is not to be regarded as limited by the uses herein specifically described, but is that of the new and useful article, process and end-product provided hereby.

I claim:

1. A heat-recoverable hollow tubular article having a heat-recoverable wall which defines (a) a relatively large internal cavity, (b) a first open end affording access to the cavity, (c) a second end, and (d) a stop means projecting into the cavity at a position between the first and second ends, said article, when heated to cause complete recovery thereof, recovering to a heat-stable form in which (1) the portion of the wall defining the cavity has recovered to a form which defines a relatively small internal cavity, (2) the portion of the wall defining the stop means has recovered to a heat-stable form which does not project into the relatively small internal cavity, and (3) the portion of the wall defining the second end has recovered to form an open end.

2. A process for protecting the end of a cable which comprises (1) positioning over the end of the cable of heat-recoverable hollow tubular article having a heat-recoverable wall which defines (a) a relatively large internal cavity, (b) a first open end affording access to the cavity, (c) a second end, and (d) a stop means projecting into the cavity at a position between the first and second ends, said article, when heated to cause complete recovery thereof, recovering to a heat-stable form in which (1) the portion of the wall defining the cavity has recovered to a form which defines a relatively small internal cavity, (2) the portion of the wall defining the stop means has recovered to a heat-stable form which does not project into the relatively small internal cavity, and (3) the portion of the wall defining the second end has recovered to form an open end; said heat-recoverable article being positioned over the end of the cable so that the end of the cable lies within the relatively large internal cavity and abuts the stop means; and (2) heating the article to cause the portion of the wall defining the internal cavity to shrink into contact with the end of the cable and to cause the portion of the wall defining the stop means to recover to a heat-stable form to leave a gap between the end of the cable and the second end of the article.

* * * * *